United States Patent
Aniszozyk et al.

(10) Patent No.: US 7,490,023 B2
(45) Date of Patent: Feb. 10, 2009

(54) METHOD FOR ANALYZING EFFECTS OF PERFORMANCE CHARACTERISTICS OF AN APPLICATION BASED ON COMPLEX CONFIGURATION MODELS

(75) Inventors: Chris Aniszozyk, Austin, TX (US); Pierre Francois Padovani, Austin, TX (US); Borna Safabakhsh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 57 days.

(21) Appl. No.: 11/734,427

(22) Filed: Apr. 12, 2007

(65) Prior Publication Data

US 2008/0256520 A1    Oct. 16, 2008

(51) Int. Cl.
*G06F 11/30* (2006.01)
*G06F 15/00* (2006.01)

(52) U.S. Cl. .................. 702/182; 717/127; 714/47
(58) Field of Classification Search ......... 702/182–184, 702/186; 714/37–40, 47; 706/45–46, 55; 717/106–108, 124, 127–129
See application file for complete search history.

(56) References Cited

U.S. PATENT DOCUMENTS

| | | | | |
|---|---|---|---|---|
| 5,402,431 A | * | 3/1995 | Saadeh et al. | 714/47 |
| 5,949,971 A | * | 9/1999 | Levine et al. | 714/47 |
| 6,144,954 A | * | 11/2000 | Li | 706/62 |
| 6,374,369 B1 | * | 4/2002 | O'Donnell | 714/38 |
| 6,484,261 B1 | | 11/2002 | Wiegel | |
| 6,625,797 B1 | | 9/2003 | Edwards et al. | |
| 6,662,235 B1 | | 12/2003 | Callis et al. | |
| 6,718,380 B1 | | 4/2004 | Mohaban et al. | |
| 6,742,143 B2 | | 5/2004 | Kaler et al. | |
| 6,957,208 B1 | * | 10/2005 | Boucher et al. | 706/55 |
| 6,990,437 B1 | * | 1/2006 | Abu El Ata | 703/2 |

(Continued)

OTHER PUBLICATIONS

Oberle et al., "Developing and Managing Software in an ontology-Based Application Server", Proceedings of the International Middleware Conference, 2004, Berlin, Germany, pp. 459-477.

(Continued)

*Primary Examiner*—Hal D Wachsman
*Assistant Examiner*—Mary C Baran
(74) *Attorney, Agent, or Firm*—Duke W. Yee; Jeffrey S. LaBaw; James O. Skarsten

(57) ABSTRACT

A method is provided for analyzing performance of a software application that is configured to contain a number of objects, wherein the application defines operations that include respective objects and relationships corresponding thereto. Performance costs are assigned to respective objects and to their corresponding relationships, and a total cost is computed for each of the operations from the assigned performance costs. Notice is provided when the cost of a particular operation exceeds a pre-specified performance threshold.

20 Claims, 4 Drawing Sheets

U.S. PATENT DOCUMENTS

| | | | |
|---|---|---|---|
| 2002/0091990 | A1 | 7/2002 | Little et al. |
| 2002/0120784 | A1 | 8/2002 | Rajarajan et al. |
| 2002/0169957 | A1 | 11/2002 | Hale et al. |
| 2003/0177018 | A1 | 9/2003 | Hughes |
| 2004/0186603 | A1* | 9/2004 | Sanford et al. .......... 700/95 |

OTHER PUBLICATIONS

Sivashanmugam et al., "Framework for Semantic Web Process Composition", International Journal of Electronic Commerce, Winter 2004-5, vol. 9, pp. 71-106.

Shende et al., "The TAU Parallel Performance System", submitted to International J. High Performance Computing Applications, ACTS, Collection Special Issue, 2005, http://www.cs.uoregon.edu/research/paracomp/papers/ijhpca05.tau/TAU_ACTS_SS.pdf.

Teresco et al., "Approaches to Architecture-Aware Parallel Scientific Computation", last update Mar. 13, 2005, (Wayback Machine) http://www.cs.williams.edu/~terescoj/research/publications/pp04/pp04.pdf.

U.S. Appl. No. 11/340,446, filed Jan. 26, 2006, Aniszczyk et al.

* cited by examiner

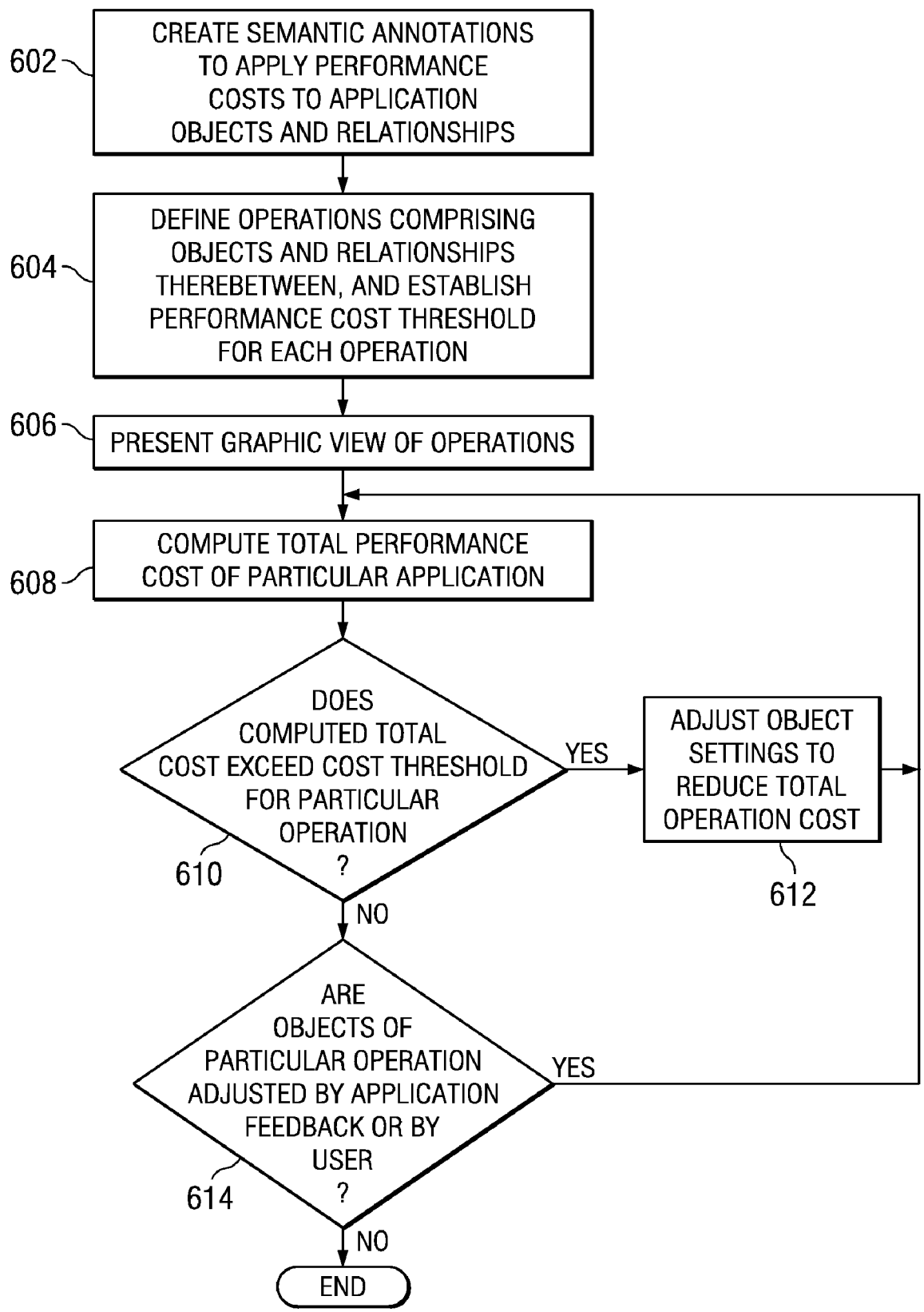

METHOD FOR ANALYZING EFFECTS OF PERFORMANCE CHARACTERISTICS OF AN APPLICATION BASED ON COMPLEX CONFIGURATION MODELS

BACKGROUND OF THE INVENTION

1. Field of the Invention

The invention disclosed and claimed herein generally pertains to a method for analyzing or evaluating performance characteristics of a complex software application, based on configuration models for the application. More particularly, the invention pertains to a method of the above type wherein the costs of performance characteristics are evaluated and may be represented as numerical values. Even more particularly, the invention pertains to a method of the above type for determining the total cost of operational flows of the application, in order to identify performance bottlenecks associated with the application.

2. Description of the Related Art

A complex software application, such as is used in Information Technology management software, may include a large number of objects of different kinds which can have many bits of code and different settings. The complex configuration of the application may also be tied directly to its performance characteristics. As a result, it can be very difficult to design, understand and modify the configuration, in order to improve performance of the software, or to achieve an improved performance model.

At present, efforts to improve performance of complex applications largely rely on trial and error. Thus, after applying a particular application configuration, performance of the application is tested and measured. This procedure is continually repeated, until a desired goal is achieved. Currently used approaches may also rely on heuristics and experience. In accordance therewith, an experienced deployment engineer can apply his or her experience to improving the performance of the application, by making configuration changes. Repeated testing then ensues, to ensure that the desired performance characteristics are achieved.

Both of the above known solutions require repeated performance testing of the complex application under load, in order to ensure that required performance goals are met. For the most part, both approaches use trial and error to find the proper configuration. It would be very beneficial if performance characteristics of a complex application could be dynamically calculated for a particular configuration, before the configuration was applied to or implemented in the application.

SUMMARY OF THE INVENTION

In an embodiment of the invention, a method is provided for analyzing performance of a software application that is configured to contain a number of objects, wherein the application defines one or more operations that include respective objects and relationships corresponding thereto. The method comprises the steps of assigning performance costs to respective objects and to their corresponding relationships, and computing a total cost for each of the operations from the assigned performance costs. Notice is provided when the cost of a particular operation exceeds a pre-specified performance threshold.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flow chart showing steps for a method comprising an embodiment of the invention.

DETAILED DESCRIPTION OF THE PREFERRED EMBODIMENT

Figure 1:
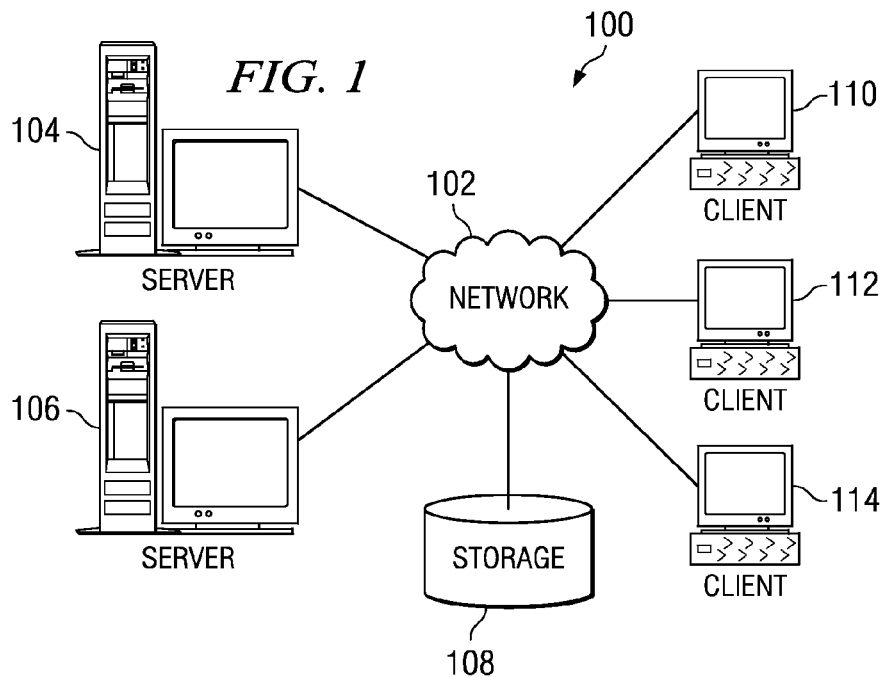
FIG. 1 is a block diagram showing a distributed data processing system for use in implementing an embodiment of the invention.
Figure 2:
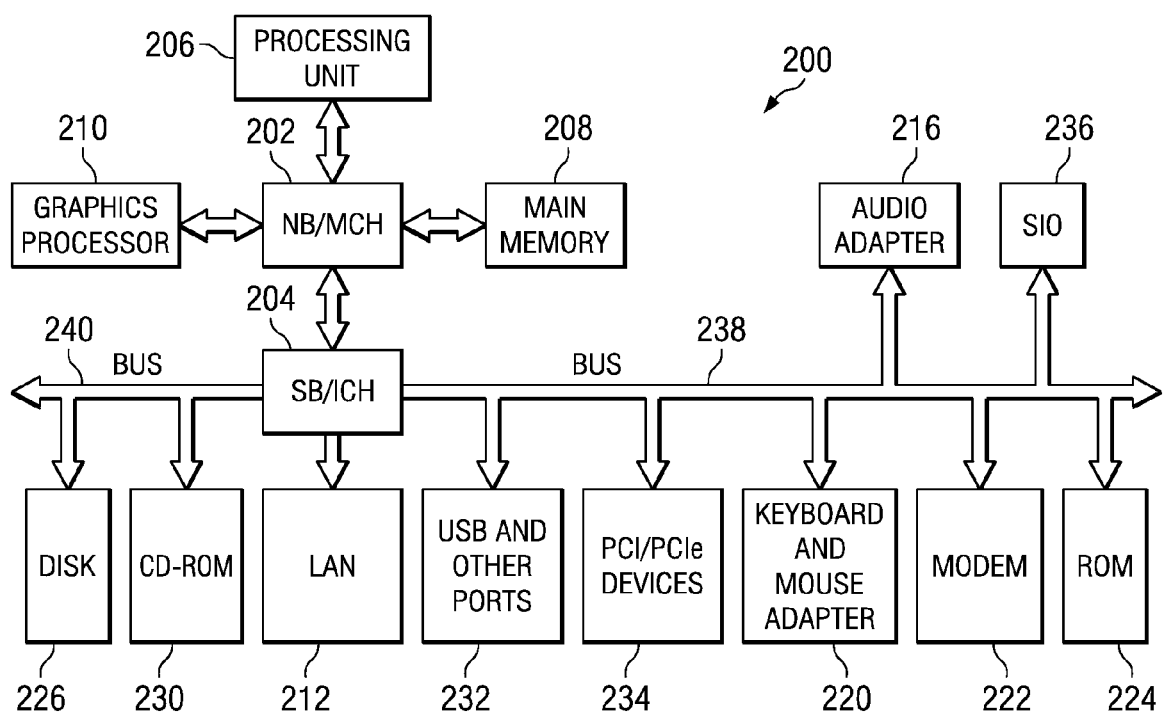
FIG. 2 is a block diagram showing a data processing system that may be used in the embodiment of FIG. 1.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram showing a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

A graphical interface, such as described hereinafter in connection with FIG. 3 and implemented by means of data processing system 200, may be used in embodiments of the present invention. An expert system may also be used in embodiments of the invention, wherein an expert system is an artificial intelligence application that uses a knowledge base of human expertise for problem solving. The expert system solves problems by mimicking the decision-making ability of the human experts by relying on and manipulating large stores of expert knowledge. The expert system also alerts the user to invalid or inconsistent inter-object structures.

Figure 3:
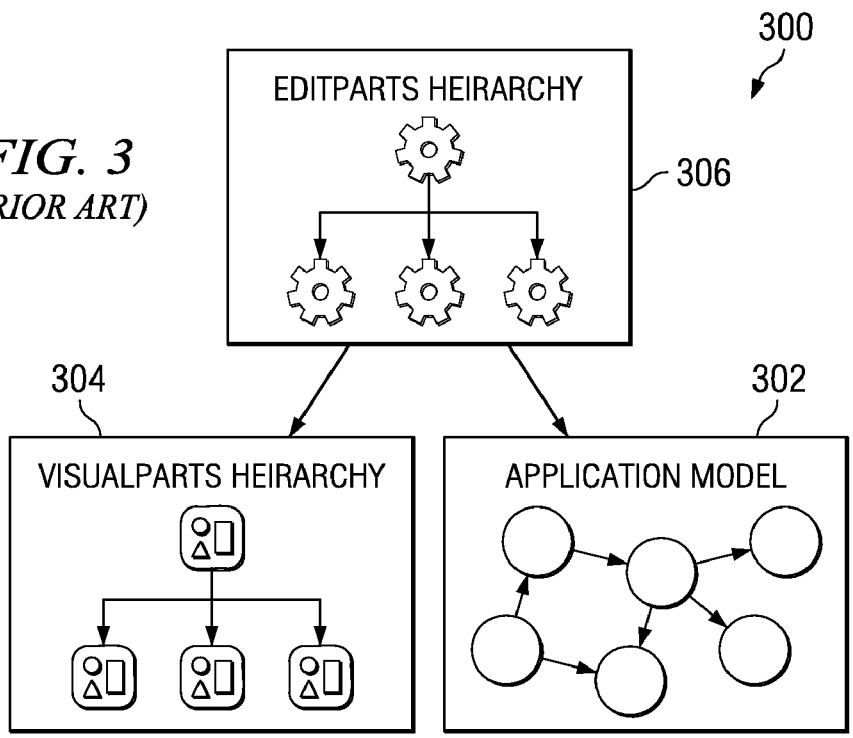
FIG. 3 is a diagram of a model-view controller paradigm for use in an embodiment of the invention.

FIG. 3 is a diagram of a known model-view-controller (MVC) paradigm, which may be useful in connection with an embodiment of the invention. MVC paradigm 300 comprises a standard approach to presenting data graphically, and may be used to work with any type of data. In particular, the MVC paradigm separates an application object model from the way the model is graphically represented to the user (view). The model-view-controller also separates the model and the view from the way in which the user controls the model (controller).

The model, such as application object model 302, represents a real-world process or system and describes how the system works. The model comprises data and functions that operate on the data. The model also manages one or more data elements and responds to queries about the state of the model and instructions to change state.

The view is a visual representation of the model. In this illustrative example, visualparts hierarchy 304 presents the view of the model to the user through a combination of graphics and text.

The controller is the means by which the user interacts with the application. The controller mediates and provides the communication bridge between the application model 302 and the visualparts hierarchy 304. Upon receiving user input, the controller, or editparts hierarchy 306 in this illustrative example, maps these user actions into commands that are sent to the model and/or view to effect the appropriate change. Editparts hierarchy 306 may comprise various controller levels, wherein the top level controller allows child controllers to be created for each element in a model hierarchy tree. The controllers may build and modify the view according to the contents of the model.

It has been recognized that an MVC paradigm, such as is shown in FIG. 3, can be used to provide a semantic model that represents respective objects that are configured into a complex application. Moreover, in accordance with embodiments of the invention, semantic annotations are applied to the semantic model. The annotations enable the application to define performance characteristics of application objects, and also to define relationships associated with respective objects. Corresponding performance costs can be determined from the performance characteristics, wherein the performance costs are represented by numerical values applied to respective objects.

A "semantic model", as used herein, is an abstract representation of an actual data model as defined in a programming language. For a data model comprising a number of related objects, the semantic model describes the semantics of each object, that is, things such as how an object works, what attributes or properties the object has, and what configurations can be made to the object. "Semantic annotations" are additional annotations made to a semantic model that allow further refinement of the model for items like attribute constraints or performance characteristics. Thus, a semantic annotation is a means for making a change or modification to a semantic model.

Figure 5:
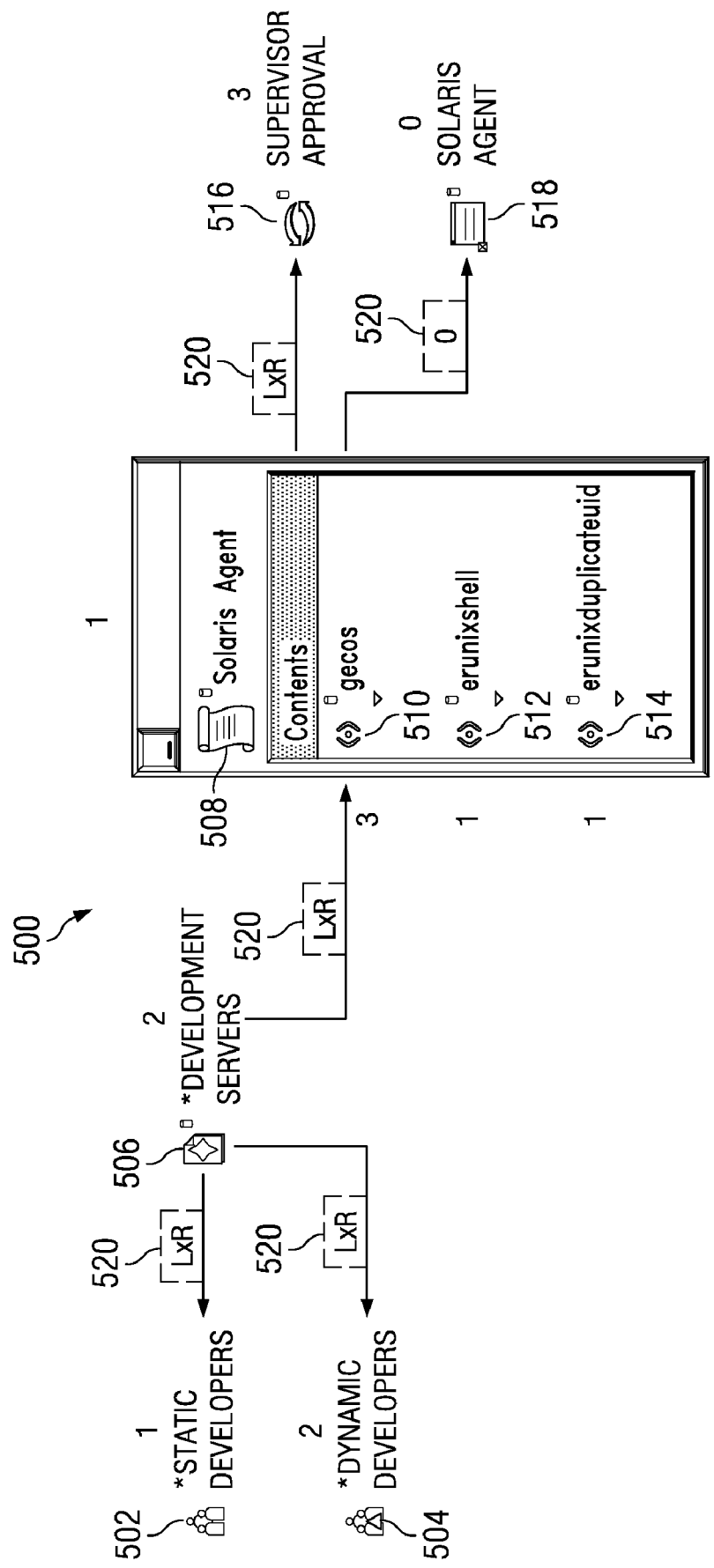
FIG. 5 is a schematic diagram showing application object models and operation flows for an embodiment of the invention.

A "graphic model" is a model that graphically represents an instance of the data model described by the semantic model. The graphic model could do so by displaying an icon, label and/or colors. As described hereinafter in further detail, FIG. 5 depicts a graphic model 500 that is an instance of a semantic model (not shown). As a further illustration, the concept of a dictionary, as a scheme consisting of words and corresponding definitions, would be an example of a semantic model. A book containing specific words and their definitions would then be an example of an instance of the dictionary semantic model.

It is to be understood that two types or overall classifications of persons interact with complex applications of the type described herein. These two types are referred to herein as developers and deployers or deployers/users, and are respectively defined hereinafter. There is a clear delineation between what each does, and their tasks do not overlap or coincide. Instead the deployer/user leverages the design/annotations put down by the developer.

It is to be understood that semantic annotations can be created for a semantic model as described above, usually by a deployer/user, but possibly also by a developer. A semantic annotation is added to a model object at runtime, by adding additional properties dynamically to the object. A developer typically would not add semantic annotations at runtime, but instead would make structural modifications to the object during development. Semantic annotations can have the form of attribute value pairs, that is, a pair comprising a key and an associated value. A semantic annotation could also be data that is keyed off of an attribute value pair. As stated above, semantic annotations can be used to define performance characteristics of respective objects of a semantic model, and can also be used to define relationships between different objects. In embodiments of the invention, semantic annotations can be very usefully employed as a mechanism for assigning performance costs to respective objects, and to their corresponding relationships, although the scope of the invention is not limited thereto.

Examples of semantic annotations would be specific values indicating respective performance costs of different objects. A further example would be a formula for use in computing the cost of a relationship or transaction taking place between different objects. Further examples of semantic annotations are set forth hereinafter, in connection with FIG. 5.

1) Developer The primary responsibility of the developer is the development of the semantic model as well as the annotations that allow performance calculations to occur. This includes the static costs of objects and the relationships between them. Once this has been done, the developer no longer has any interaction with actual customer deployments of the application.

2) Deployer/User The responsibility of the deployer/user is to design the configuration of the application for the IT environment. In doing so he/she will be creating the graph or topology of objects based on the semantic models defined by the developer. As this person manipulates the overall model, the system will constantly calculate the performance characteristics based on the semantic model and annotations and how this person has set up the configuration. As stated, if the user believes a particular object is of higher importance than others, they have the ability to adjust that information about the object dynamically.

Figure 4:
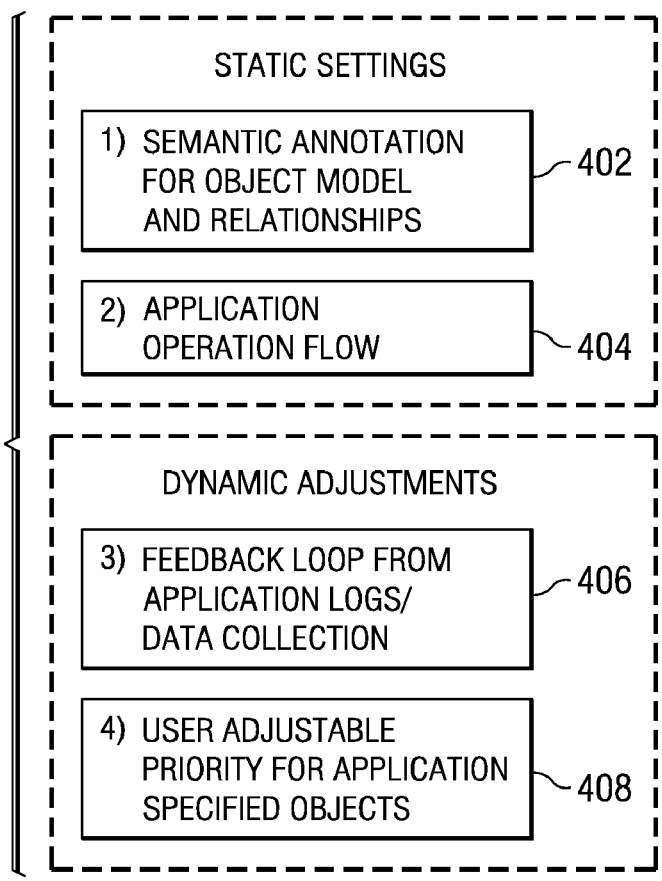
FIG. 4 is a chart pertaining to assignment of performance costs for an embodiment of the invention.

Referring to FIG. 4, there is shown a chart depicting four levels at which performance costs of application objects can be defined and adjusted. Cost adjustments can be made by the application during the semantic model design process, or can be adjusted at application run time by the application or by a deployer/user thereof. FIG. 4 further shows that levels 402 and 404 pertain to static settings of performance costs, whereas levels 406 and 408 pertain to dynamic cost adjustments.

When a developer is in the process of designing a complex application, he or she will generally have a good idea, based on knowledge and experience, of the performance characteristics of respective modeled objects. Relying on such knowledge and experience, the developer can create a semantic annotation for an object that consists of two parts, as shown by layer 402 of FIG. 4. The first part is a direct static cost of the object, incurred to perform tasks associated with the object, and the second part is the cost of each relationship to that object. Each such cost is expressed as a comparative numerical value. For example, if a relationship of a particular object required retrieving data from a database, the cost of the relationship would clearly be higher than if it was not necessary to expend effort retrieving the data.

Moreover, the semantic annotations for an object can include certain properties that are expressed as numerical values. This enables the static cost of an instance of the object to be adjusted at run time, by application-specific code based on values of the properties that are set by the deployer/user. The cost of an object relationship can be determined by an addition procedure, or from a specified simple equation or other mathematical formula.

Layer 404 of FIG. 4 is directed to operation flows defined by an application. Typically, an application comprising a complex configuration does not have just one object in its configuration. Rather, the configuration will include multiple objects, each having a semantic model, wherein the objects are connected to each other in a very large number of different ways. Accordingly, the application defines multiple operation flows, wherein a particular operation flow indicates the order in which semantic models of different objects are used in carrying out a particular kind of application operation.

When the model of one object is connected to the model of another object, there will generally be a cost for such connection or relationship. Thus, in addition to defining respective operation flows, the application also determines the total cost of each operation, from the respective performance costs of the objects and relationships included therein. Usefully, the application may make adjustments to operational costs at run time.

Moreover, the application defines a performance threshold for each of its operations. If the total cost of a particular operation is found to exceed the threshold for the operation, it may be concluded that the particular operation will become a performance bottleneck for the application. Upon encountering this situation, the application deployer may make changes to the pertinent object model, in order to remove the bottleneck.

Referring further to FIG. 4, there is shown a feedback loop adjustment layer 406. When the application is running, the feedback loop enables the application to dynamically adjust the performance costs of objects and operations, based on real time data acquisition. This feedback loop is discussed in further detail hereinafter, in connection with FIG. 5.

The behavior of an application frequently cannot be predicted from direct costs and feedback as described above. Rather, as indicated by layer 408, further adjustments to object cost performance may be made in view of the priorities or experiences of deployers/users. For example, based on business experience a deployer/user may know that a particular object or operation flow is more or less important than other operations, or is more or less frequent than others. Based on this knowledge, the over-all performance cost for each operation defined by the application may need to be adjusted up or down. Also, it is generally necessary to ensure that objects of higher priority and importance perform better than those of lesser, and that bottlenecks are definitely avoided in the most important operation flows.

Referring to FIG. 5, there is shown a graphic model 500 illustrating the respective flows of different operations that may be performed by a complex application. FIG. 5 more particularly depicts actual running code of an application, and shows respective application objects 502-518. Objects 502 and 504 are the role objects Static Developers and Dynamic Developers, respectively, and object 506 is a policy object known as Development Servers. The object 508, Solaris Agent, has three children objects, namely, object 510 (gecos), object 512 (erunix shell) and object 514 (erunixduplicateuid). Object 516 is the workflow object Supervisor Approval and object 518 is the agent object Solaris Agent. The graphic model 500 generally illustrates that anyone having the role of Static Developer has access to the agent object 518, (Solaris Agent), and that anyone in the role of Dynamic Developer would likewise have access to agent object 518.

For simplicity, an operation in graphic model 500 can flow or proceed only from left to right, as viewed in FIG. 5. Also, each operation can include only one of the left-most objects, that is, only object 502 (Static Developers) or object 504 (Dynamic Developers). Thus, only two operations are possible in the model 500 shown by FIG. 5.

In order to include the costs of a relationship or connection between objects, FIG. 5 further shows a multiply calculation 520 between each pair of adjacent objects. Each multiply calculation 520 is an example of a semantic annotation that has been added to model 500. Each operation 520 indicates that in computing relationship costs for an operation in graphic model 500, the computed total cost to the left of a calculation 520 is to be multiplied by the total cost to the right thereof. Moreover, when objects contain children, such as object 508, all of the object costs of the parent and child objects are to be added together.

As discussed above, from an understanding of the performance characteristics of each object, an application developer can determine performance cost values for respective objects and for the relationships between them. The developer can also determine acceptable performance cost thresholds for the various operations that can be carried out by the application. By selectively processing this information, bottlenecks in the application can be identified, so that adjustments can be made to avoid the bottlenecks. It is to be emphasized that this activity may be carried out while configuration objects for an application are being developed, such as in a workbench environment or the like. Thus, performance bottlenecks in an application may be identified before an application is installed for use.

Referring further to FIG. 5, for illustrative purposes there is shown object 502 assigned a cost of 1, objects 504 and 506 each assigned a cost of 2, and object 516 assigned a cost of 3. Parent object 508 has a cost of 1, and its child objects 510-514 have costs of 3, 1 and 1, respectively. The object 518 is assigned a 0 cost. Also for purposes of illustration, the performance threshold for each operation of FIG. 5 is set to a threshold value of 100. From these values, and from the computational procedures described above, the total static cost of the operation that includes Static Developers object 502 would be the cost of such object multiplied by the cost of object 506, by the sum of the costs of objects 508-514, and by the cost of object 516. Thus, the total cost of the operation would be as follows:

Static Developers: $1 \times 2 \times (1+3+1+1) \times 3 = 36$

Similarly, the total static cost of the operation including Dynamic Developers would be:

Dynamic Developers: $2 \times 2 \times (1+3+1+1) \times 3 = 72$

The formula (1+3+1+1), comprising the sum of the costs of parent object 508 and its child objects 510-514, is a further example of a semantic annotation that has been added to model 500. The above computations indicate that the total static costs for both the object 502 operation and the object 504 operation would be less than the performance threshold of 100. However, as described above in connection with layer 408 of FIG. 4, an application deployer/user may provide the additional information that there are many more Static Developers than Dynamic Developers. Therefore, to ensure that the actual effort required for the Static Developers operation is accurately represented in the performance cost for such operation, an associated setting for such operation could be adjusted to a factor such as 3. Increasing the total cost of the Static Developers operation by a factor of 3, from 36 to 108, would cause the total cost of the operation to exceed the performance threshold of 100. This could result in a performance bottleneck being identified in the configuration object. Upon being made aware of the bottleneck, the developer could act to correct it, such as by making adjustments to related sub-objects. The correction could be made before committing the object configuration to the application, thereby reducing the over-all deployment time for the application.

The feedback loop shown in FIG. 4 functions by analyzing logs, or direct data feed, from an application in regard to the corresponding configured model. To illustrate the feedback loop in relation to the model of FIG. 5, it is assumed that a user thereof has performed a test against a developer role. The timing data collected by analyzing the logs or direct feedback about the performance of the logic path of the developer role, to the solaris endpoint, would be compared and/or merged with the existing data to determine its performance characteristics. Once this data is available and basic analysis has been done, it becomes easy to determine the potential bottleneck for performance.

Referring to FIG. 6, there are shown steps for a procedure in accordance with an embodiment of the invention. At step 602, semantic annotations are created by the developer of a complex application, for use in applying performance costs to object and object relationships configured in the application. At steps 604 and 606, operations defined by the application are visually presented, wherein respective operations comprise objects and relationships therebetween as described above. The expert system described above in connection with FIG. 2, and the MVC paradigm 300 shown in FIG. 3, may respectively be used in performing steps 604 and 606. At step 604 the application also defines or establishes a performance cost threshold for each operation.

Referring further to FIG. 6, at steps 608 and 610 total cost of a particular operation is computed and compared with its corresponding threshold. If the total cost is found to exceed the threshold, adjustments must be made to reduce the total cost of the particular operation, as shown by step 612. For example, adjustments may be made to settings or sub-objects of one or more of the objects. After adjustment, steps 608 and 610 are again performed for the particular operation.

If the total cost for the particular operation is found not to exceed its threshold, it may still be necessary to consider whether objects of an operation have been dynamically adjusted, as described above. This is shown by step 614. If dynamic adjustment has been made, steps 608 and 610 would be performed on the adjusted operation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for analyzing performance of a software application initially configured to contain a number of objects, wherein the application defines one or more operations that include respective objects and relationships corresponding thereto, said method comprising the steps of:
   prior to execution of said application or of any of said objects, estimating performance costs of respective objects, and of their corresponding relationships with one another, based on the initial configuration of said application;
   computing a total cost for each of said operations from said estimated performance costs;
   providing notice when the total cost of a particular operation exceeds a pre-specified performance threshold; and
   selectively adjusting one or more of said objects, in response to said notice, to provide a total cost for said particular operation that does not exceed said threshold.

2. The method of claim 1, wherein:
   when the total cost of said particular operation is found to exceed said pre-specified threshold, the initial configuration of said application is changed by selectively adjusting one or more objects associated with said particular operation, in order to reduce the total cost of said particular operation to an amount that does not exceed said performance threshold.

3. The method of claim 1, wherein:
   performance costs are assigned to said objects and relationships as said application is being configured by a developer of said application.

4. The method of claim 1, wherein:
   one or more objects are selectively adjusted, in order to adjust the particular operation to overcome a performance bottleneck.

5. The method of claim 4, wherein:
   a semantic annotation for a given object comprises a direct cost for said given object, and a cost for a relationship to said given object.

6. The method of claim 5, wherein:
   the direct cost of an instance of said given object is adjustable at run time by a deployer/user, by means of an application-specific code based on values set by said deployer/user.

7. The method of claim 1, wherein:
   each of said relationship costs is computed from a pre-specified mathematical formula.

8. The method of claim 1, wherein:
   said application is configured to define a pre-specified performance threshold for each of said operations.

9. The method of claim 1, wherein:
said application is provided with a feedback loop for use in dynamically adjusting associated semantic annotation settings, based on real-time data acquisition.

10. The method of claim 1, wherein:
said application is adapted to enable a deployer/user thereof to adjust the total cost of each operation upward or downward, selectively.

11. A computer program product in a computer readable medium for analyzing performance of a software application initially configured to contain a number of objects, wherein the application defines one or more operations that include respective objects and relationships corresponding thereto, said computer program product comprising:
first instructions for estimating, prior to execution of said application or of any said objects, performance costs of respective objects, and of their corresponding relationships with one another, based on the initial configuration of said application;
second instructions for computing a total cost for each of said operations from said estimated performance costs;
third instructions for providing notice when the total cost of a particular operation exceeds a pre-specified performance threshold; and
fourth instructions for selectively adjusting one or more of said objects, in response to said notice, to provide a total cost for said particular operation that does not exceed said threshold.

12. The computer program product of claim 11, wherein:
when the total cost of said particular operation is found to exceed said pre-specified threshold, the initial configuration of said application is changed by selectively adjusting one or more objects associated with said particular operation, in order to reduce the total cost of said particular operation to an amount that does not exceed said performance threshold.

13. The computer program product of claim 11, wherein:
performance costs are assigned to said objects and relationships as said application is being configured by a developer of said application.

14. The computer program product of claim 11, wherein:
said assigned performance costs comprise numerical values provided by semantic annotations that are created for respective objects by a developer of said application.

15. The computer program product of claim 11, wherein:
each of said relationship costs is computed from a pre-specified mathematical formula.

16. The computer program product of claim 11, wherein:
said application is configured to define a pre-specified performance threshold for each of said operations.

17. The computer program product of claim 11, wherein:
said application is provided with a feedback loop for use in dynamically adjusting associated semantic annotation settings, based on real-time data acquisition.

18. An apparatus for analyzing performance of a software application initially configured to contain a number of objects, wherein the application defines one or more operations that include respective objects and relationships corresponding thereto, said apparatus comprising:
a graphical device for presenting objects and their relationships in viewable form;
an annotating device for estimating, prior to execution of said application or of any of said objects, performance costs of respective objects, and of their corresponding relationships with one another, based on the initial configuration of said application;
a processing device for computing a total cost for each of said operations from said assigned estimated performance costs;
a device for providing notice when the total cost of a particular operation exceeds a pre-specified performance threshold; and
a device for selectively adjusting one or more of said objects, in response to said notice, to provide a total cost for said particular operation that does not exceed said threshold.

19. The apparatus of claim 18, wherein:
said apparatus includes a device for changing the initial configuration of said application by adjusting one or more objects associated with said particular operation, when the total cost of said particular operation is found to exceed said pre-specified threshold, in order to reduce the total cost of said particular operation to an amount that does not exceed said performance threshold.

20. The apparatus of claim 18, wherein:
said processor device computes each of said relationship costs using a pre-specified mathematical formula.

* * * * *